United States Patent
Iguchi

(10) Patent No.: US 9,517,749 B2
(45) Date of Patent: Dec. 13, 2016

(54) VEHICLE BODY SIDE STRUCTURE

(71) Applicant: HONDA MOTOR CO., LTD., Tokyo (JP)

(72) Inventor: Hirotaka Iguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/854,417

(22) Filed: Sep. 15, 2015

(65) Prior Publication Data

US 2016/0075380 A1 Mar. 17, 2016

(30) Foreign Application Priority Data

Sep. 17, 2014 (JP) .................................. 2014-189008

(51) Int. Cl.
| | | |
|---|---|---|
| *B62D 25/02* | (2006.01) | |
| *B62D 25/04* | (2006.01) | |
| *B62D 25/08* | (2006.01) | |
| *B60R 22/34* | (2006.01) | |

(52) U.S. Cl.
CPC ............ *B60R 22/341* (2013.01); *B62D 25/04* (2013.01); *B62D 25/08* (2013.01)

(58) Field of Classification Search
CPC ....... B62D 25/02; B62D 25/08; B62D 25/087; B62D 25/04; B60R 22/24; B60R 2022/3402
USPC ............ 296/187.12, 193.02, 193.06, 193.05, 296/203.01, 203.03, 29, 30, 24.4, 24.44
See application file for complete search history.

(56) References Cited

U.S. PATENT DOCUMENTS

| | | | | |
|---|---|---|---|---|
| 5,881,458 A | * | 3/1999 | Wolf ...................... | B62D 25/00 29/458 |
| 6,286,896 B1 | * | 9/2001 | Eipper ................. | B62D 25/087 296/187.03 |
| 6,443,518 B1 | * | 9/2002 | Rohl .................... | B62D 25/082 296/187.12 |
| 8,360,472 B2 | * | 1/2013 | Froschle ................ | B60R 21/13 280/756 |
| 8,567,857 B2 | * | 10/2013 | Fujii ..................... | B60R 22/023 296/193.05 |
| 9,061,708 B2 | * | 6/2015 | Sugiyama .............. | B62D 25/16 |
| 2005/0140129 A1 | * | 6/2005 | Miki ...................... | B60R 21/13 280/756 |
| 2006/0061153 A1 | * | 3/2006 | Hamamoto .............. | B60R 7/04 297/188.04 |

(Continued)

FOREIGN PATENT DOCUMENTS

JP 2-105060 U 8/1990

*Primary Examiner* — Gregory Blankenship
(74) *Attorney, Agent, or Firm* — Westerman, Hattori, Daniels & Adrian, LLP

(57) ABSTRACT

A vehicle body side structure includes a pair of left and right pillars, a center bulk, and gussets. The pair of pillars extend in an up-down direction in side parts of a vehicle body. The center bulk is disposed behind a seat of a vehicle and extends between the pillars in a vehicle width direction. The gussets are connected to the pillars and the center bulk. The gussets each include a first connecting portion connected to a corresponding one of the pillars, a second connecting portion connected to the center bulk, a retractor attachment portion provided below the first connecting portion and the second connecting portion and serving as a component attachment portion where a vehicle body component is attached, and a fragile portion provided between the second connecting portion and the retractor attachment portion.

17 Claims, 15 Drawing Sheets

(56) References Cited

U.S. PATENT DOCUMENTS

| | | | |
|---|---|---|---|
| 2008/0061542 A1* | 3/2008 | Froschle | B60R 21/13 280/756 |
| 2009/0174220 A1* | 7/2009 | Guo | B62D 21/157 296/187.12 |
| 2010/0078925 A1* | 4/2010 | Froschle | B60R 21/13 280/756 |
| 2010/0194089 A1* | 8/2010 | Ito | B60R 22/24 280/801.2 |
| 2010/0327631 A1* | 12/2010 | Brunner | B62D 27/065 296/205 |
| 2011/0031781 A1* | 2/2011 | Nishimura | B62D 25/04 296/187.12 |
| 2011/0156446 A1* | 6/2011 | Iwase | B62D 25/025 296/193.06 |
| 2012/0049557 A1* | 3/2012 | Sakai | B62D 25/087 296/24.4 |
| 2013/0015282 A1* | 1/2013 | Thole | B65H 49/16 242/127 |
| 2013/0169006 A1* | 7/2013 | Sera | B62D 25/087 296/203.04 |
| 2014/0062130 A1* | 3/2014 | Yoshimura | B62D 21/157 296/187.08 |
| 2014/0152054 A1* | 6/2014 | Yano | B62D 25/087 296/193.08 |
| 2015/0251703 A1* | 9/2015 | Yamada | B62D 25/087 296/187.12 |
| 2016/0075380 A1* | 3/2016 | Iguchi | B62D 21/157 296/187.12 |

\* cited by examiner

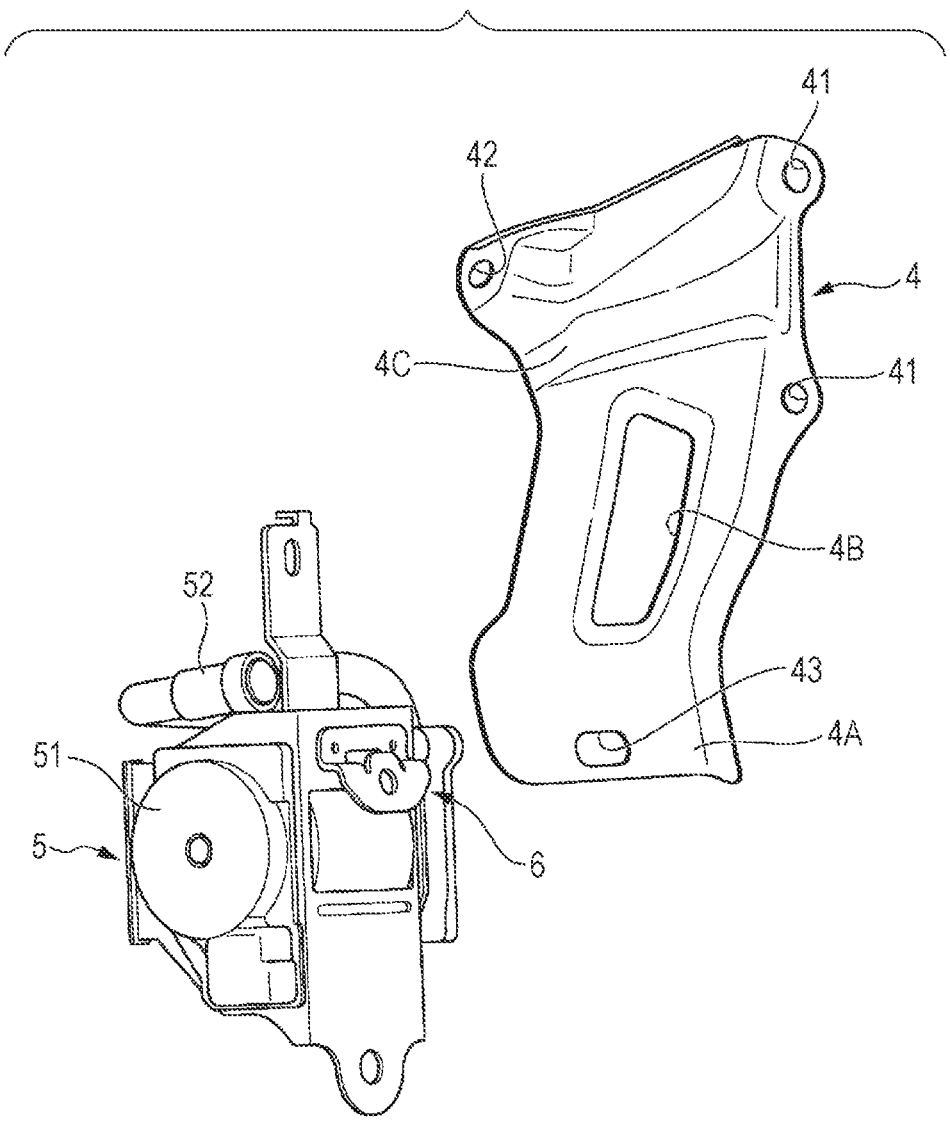

VEHICLE BODY SIDE STRUCTURE

CROSS REFERENCES TO RELATED APPLICATIONS

The present application claims priority under 35 U.S.C. §119 to Japanese Patent Application No. 2014-189008, filed Sep. 17, 2014 entitled "Vehicle Body Side Structure." The contents of this application are incorporated herein by reference in their entirety.

TECHNICAL FIELD

The present disclosure relates to a vehicle body side structure that includes gussets that transmit side collision loads.

BACKGROUND

As a related-art seat belt apparatus that ensures safety of an occupant of a vehicle, for example, the following seat belt apparatus is known: that is, the seat belt apparatus includes a retractor and an anchor member that are secured to a seat back panel. The retractor retracts and contains a seat belt, and the anchor member guides the seat belt withdrawn from the retractor from a rear side to the front side of a seat back (for example, see Japanese Unexamined Utility Model Registration Application Publication No. 2-105060).

Furthermore, nowadays, a detector referred to as a pretensioner sensor is provided in the retractor. This pretensioner sensor detects a shock or the like in the case of, for example, collision of the vehicle so that the seat belt can be retracted before payout of the seat belt from the retractor is prohibited. This allows the seat belt to restrain the occupant earlier.

SUMMARY

Here, from page 8, line 11 to page 9, line 10 in Japanese Unexamined Utility Model Registration Application Publication No. 2-105060, it is described that a plurality of leg portions of a main plate to which the retractor is attached are secured to a vehicle body panel or a rear pillar. In the case where such a structure is adopted, the main plate functions as a transmitting member that transmits a load from the rear pillar to the vehicle body panel when a side collision load is input to the vehicle.

However, when the main plate to which the retractor is attached functions as the transmitting member of the side collision load as described above, the retractor may be moved or deformed due to deformation of the main plate. Thus, when the pretensioner sensor is provided in, for example, the retractor described in Japanese Unexamined Utility Model Registration Application Publication No. 2-105060, the pretensioner sensor may malfunction due to its contact with the main plate when a side collision load is input. This malfunctioning may lead to a situation in which unnecessary tension is applied to the seat belt or the pretensioner sensor does not operate as intended in the design.

In view of the above-described problem, the present application describes a vehicle body side structure that can optimize load transmission when a side collision load is input to a vehicle, so that collision performance can be improved and that can effectively suppress transmission of the load to vehicle components.

According to an aspect of the present disclosure, a vehicle body side structure (for example, a vehicle body side structure 10 of an embodiment) includes a pair of left and right pillars (for example, pillars 2 of the embodiment), a center bulk (for example, a center bulk 3 of the embodiment), and gussets (for example, gussets 4 of the embodiment). The pair of left and right pillars extend in an up-down direction in side parts of a vehicle body (for example, a vehicle body 1A of the embodiment). The center bulk is disposed behind a seat of a vehicle (for example, a vehicle 1 of the embodiment) and extends between the pair of pillars in a vehicle width direction. The gussets are connected to the pillars and the center bulk, respectively. The gussets each include a first connecting portion (for example, a first connecting portion 41 of the embodiment), a second connecting portion (for example, a second connecting portion 42 of the embodiment), a component attachment portion (for example, a retractor attachment portion 43 of the embodiment), a fragile portion (for example, a fragile portion 4B, of the embodiment). The first connecting portion is connected to a corresponding one of the pillars. The second connecting portion is connected to the center bulk. The component attachment portion is provided below the first connecting portion and the second connecting portion and allows a vehicle body component (for example, the retractor 5 of the embodiment) to be attached thereto. The fragile portion is provided between the second connecting portion and the component attachment portion.

With the gussets connected to the pillars and the center bulk, when a side collision load is input, the load can be effectively transmitted from the corresponding pillar to the center bulk through a corresponding one of the gussets. This can improve the collision performance.

Furthermore, even in the case where, for example, a vehicle body component such as a retractor is required to be attached to the gusset that transmits the side collision load, with the fragile portion provided between the first and second connecting portions and the component attachment portion, an input load can be absorbed by the fragile portion, so that the load input to the component can be reduced.

Preferably, each of the gussets includes a bead (for example, a bead 4C of the embodiment) that is provided between the first connecting portion and the second connecting portion above the fragile portion and that extends in the vehicle width direction.

With the above-described bead, the load can be transmitted through a ridge portion of the bead having high strength. Thus, the collision performance can be further improved.

Furthermore, by concentrating the side collision load toward the bead, the load transmitted to the fragile portion can be reduced. Thus, the load input to the component can be further reduced.

Preferably, the fragile portion is defined by a through hole formed in each of the gussets, and an upper edge portion (for example, an upper edge portion 4a of the embodiment) of the through hole is disposed along a virtual straight line (for example, a virtual straight line K of the embodiment) that connects the first connecting portion and the second connecting portion to each other.

Thus, no hole (through hole) exists in the virtual straight line. This allows high load transmission efficiency to be maintained.

Preferably, the vehicle body side structure further includes a cross member (for example, a cross member 7 of the embodiment) and patches (for example, patches 9 of the embodiment). The cross member is coupled to a rear surface of the center bulk and defines a closed section extending in the vehicle width direction. The patches are interposed between the center bulk and the cross member. In this case, the second connecting portion of each of the gussets together with a corresponding one of the patches is connected to the center bulk.

With the above-described structure, the side collision load transmitted from the gusset can be efficiently transmitted to the cross member and the patch.

Preferably, the cross member has a U-shaped portion in section formed by a pair of an upper wall (for example, an upper wall 71 of the embodiment) and a lower wall (for example, a lower wall 72 of the embodiment) which face each other and a rear wall (for example, a rear wall 73 of the embodiment) that connects a rear end of the upper wall and a rear end of the lower wall to each other. In this case, each of the patches includes a leg portion connected to the lower wall of the cross member.

Thus, when, for example, reception of the side collision load leads to application of a load that, for example, distorts a front end of the pillar rearward and inward in the vehicle width direction, such a load can be dispersed by transmitting the load to the lower wall of the cross member. This can further improve the load transmission efficiency.

Preferably, the cross member has a hat-shaped section formed by an upper flange portion (for example, an upper flange portion 71A of the embodiment) that extends upward from a front end of the upper wall and a lower flange portion (for example, a lower flange portion 72A of the embodiment) that extends downward from a front end of the lower wall. Preferably, each of the patches includes patch flange portions (for example, patch flange portions 92 of the embodiment) respectively interposed between the center bulk and the upper flange portion of the cross member and the center bulk and the lower flange portion of the cross member. Preferably, a first spot welded portion (for example, a first spot welded portion 15 of the embodiment) at which at least three of the center bulk, the upper flange portion or the lower flange portion, and the respective patch flange portions are welded to one another by spot welding is provided.

with the above-described structure, the stiffness of the closed section of the cross member is improved. Furthermore, since the welding of three pieces is adopted, weldability of spot welding can be improved and work efficiency during the spot welding can be improved.

Preferably, the center bulk includes a bulk upper portion (for example, a bulk upper portion 31 of the embodiment) and a bulk lower portion (for example, a bulk lower portion 32 of the embodiment). The bulk upper portion is included in an upper part of the center bulk. The bulk lower portion is coupled to a lower end of the bulk upper portion and included in a lower part of the center bulk. Preferably, second spot welded portions (for example, second spot welded portions 16) at each of which at least three pieces including the bulk upper portion, the bulk lower portion, and the lower flange portion of the cross member are spot welded to one another are provided at positions to the left and to the right of the patch flange portions of each of the patches in the vehicle width direction.

By dividing the center bulk into the bulk upper portion and the bulk lower portion as described above, the formability of the center bulk can be improved. Also with such a structure, the welding of three pieces can be adopted. Thus, weldability of spot welding can be improved and work efficiency during the spot welding can be improved similarly to the above-described case.

Preferably, each of the gussets is spaced apart from the center bulk toward a front side by a specified distance, thereby forming a gap between the gusset and the center bulk, and an insertion opening (for example, an insertion opening E of the embodiment) for a seat belt (for example, a seat belt S of the embodiment) is formed by the gap.

With the above-described structure, the seat belt can be protected by the gusset.

Preferably, the vehicle body component is a retractor (for example, a retractor 5 of the embodiment) for a seat belt, the retractor includes a pretensioner sensor (for example, a pretensioner sensor 52 of the embodiment), each of the gussets includes an extension (for example, an extension 4A of the embodiment) that extends lower than the pretensioner sensor, and the component attachment portion (for example, a retractor attachment portion 43 of the embodiment) used to connect to the retractor is formed in the extension.

With the above-described structure, the pretensioner sensor can be protected by the extension at the lower end of the gusset. Thus, protection of the pretensioner sensor against damage due to contact with foreign matter can be improved.

Furthermore, the retractor is connected to the extension of the gusset. Thus, even when the gusset is moved by contact of the gusset with foreign matter, the gusset itself can be prevented from being brought into contact with the pretensioner sensor provided in the retractor because the gusset and the retractor are moved together. Thus, the pretensioner sensor can be reliably protected against damage.

Preferably, the component attachment portion has a slit shape that extends in the vehicle width direction.

With the above-described structure, even after the retractor as the vehicle body component or another component is temporarily assembled to the component attachment portion of the gusset, the gusset can be moved in the vehicle width direction within a range in which the slit is provided and fastened with reference to the first connecting portion on the pillar side, and after that, the second connecting portion and the center bulk can be firmly assembled together and the component attachment portion and the vehicle body component can be firmly assembled together. Thus, the pillar and the gusset can be connected while reliably being in tight contact with each other at the first connecting portion on the pillar side, and no gap is formed between the pillar and the gusset after the assembly. This further improves the transmission efficiency of the side collision load.

With the vehicle body side structure according to the present application, by providing the above-described gussets, when the side collision load is input, the load can be effectively transmitted from the corresponding pillar to the center bulk. This can improve the collision performance.

Furthermore, even in the case where, for example, a vehicle body component such as a retractor is attached to the gusset, with the fragile portion provided between the first and second connecting portions and the component attachment portion, an input load can be absorbed by the fragile portion, so that the load input to the component can be reduced. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

FIG. 4 is an explanatory view of the example of the vehicle body side structure according to the embodiment of the present disclosure illustrating a perspective view of a state in which the retractor and the gusset illustrated in FIG. 3 are separated from each other.

DETAILED DESCRIPTION

An example of a vehicle body side structure according to an embodiment will be described in detail below with reference to FIGS. 1 to 15 regarding the structure of the vehicle body side structure where appropriate. In the following description, a front-rear direction, an up-down direction, and a width direction refers to the front-rear direction, the up-down direction, and the width direction of a vehicle unless otherwise stated herein.

Figure 1:
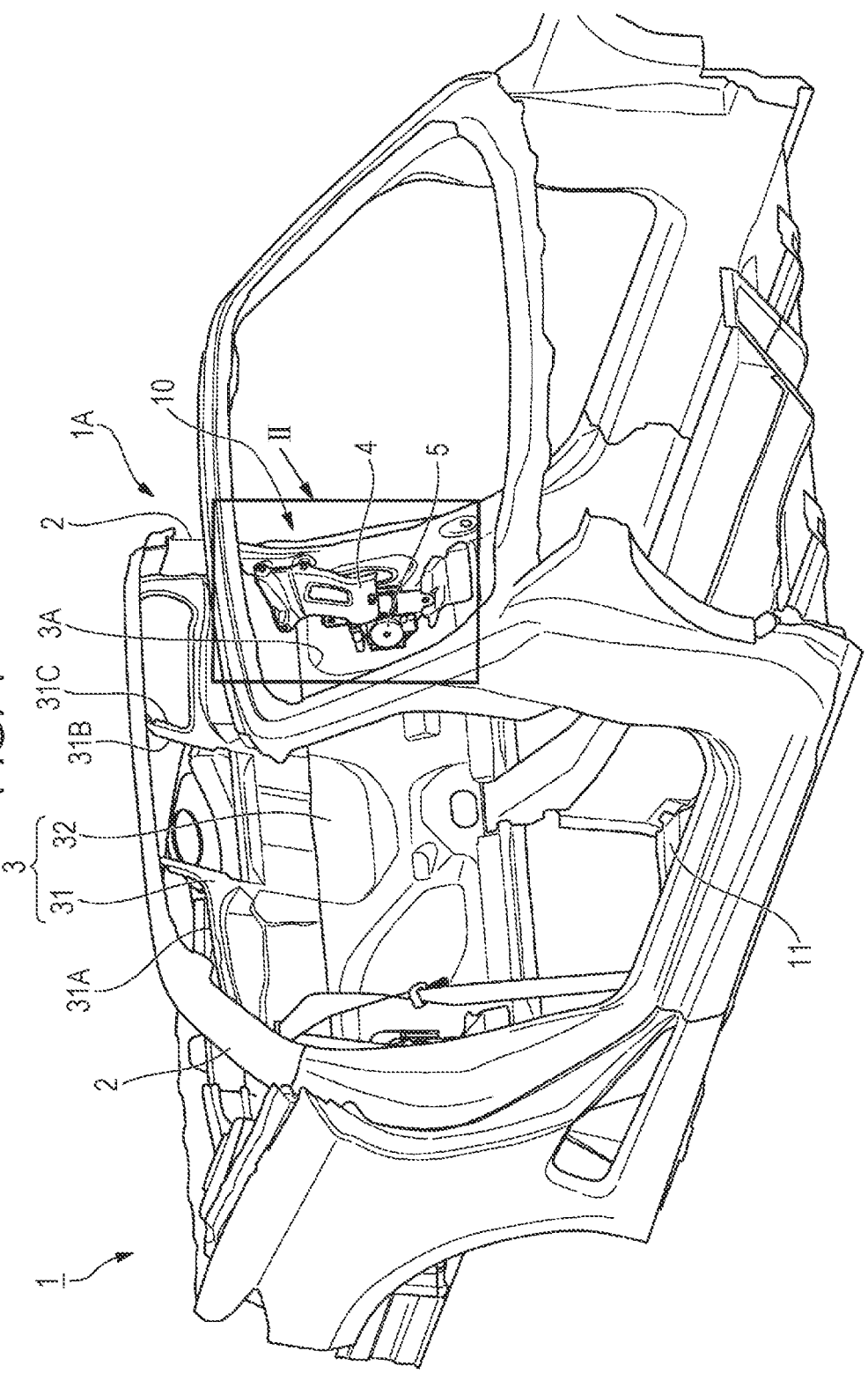
FIG. 1 is a schematic view of an overall structure of a vehicle to which a vehicle body side structure according to an embodiment is applied of the present disclosure.

FIG. 1 is a partially cutaway schematic view of an overall structure of a vehicle 1 to which a vehicle body side structure 10 according to an embodiment is applied. As illustrated in FIG. 1, the vehicle body side structure 10 according to the present embodiment is disposed in side parts behind a seat installation space of the vehicle 1. For convenience of illustration, FIG. 1 illustrates the vehicle body side structure 10 only on the left side of the vehicle body 1A. Although it is not illustrated, a side part of the vehicle body 1A on the right side has a structure that is similar to that on the left side and left-right reversed compared to that on the left side.

Figure 2:
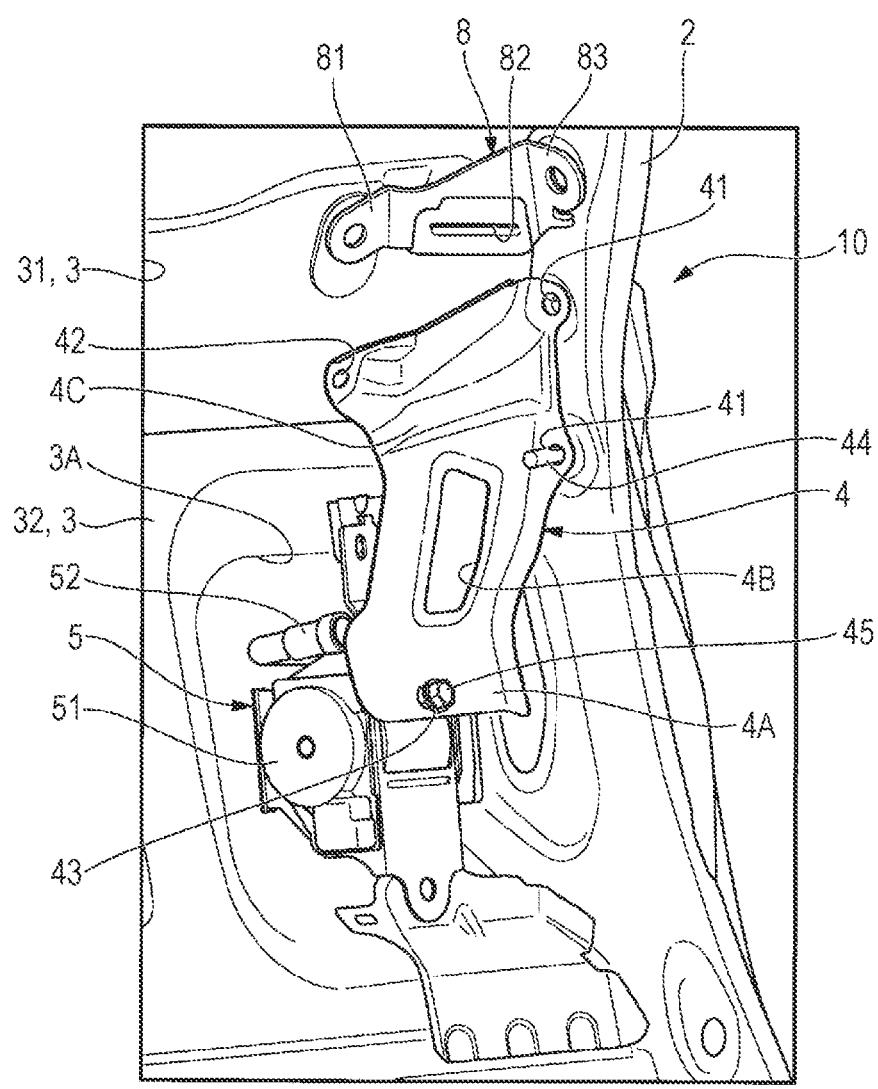
FIG. 2 is a perspective view of an example of the vehicle body side structure according to the embodiment of the present disclosure.

FIG. 2 is an enlarged view of the vehicle body side structure 10 according to the embodiment illustrated in FIG. 1. As illustrated in FIG. 2, the vehicle body side structure 10 includes a pair of left and right pillars 2, a center bulk 3, and gussets 4. The pair of pillars 2 extend in the up-down direction on the side parts of the vehicle body 1A. The center bulk 3 extends in the vehicle width direction between the pair of pillars 2. The gussets 4 are connected to the center bulk 3 and the pillars 2.

As illustrated in FIG. 1, the pair of pillars 2 extend from a floor 11 side on the lower side toward a roof side (not illustrated) at outer positions of the vehicle body 1A in the vehicle width direction. Furthermore, the pair of pillars 2 are connected to each other on the upper side of the vehicle body 1A so as to be integrated with each other. Furthermore, rear wheel houses (not illustrated) that cover the upper sides of upper halves of rear wheels (not illustrated) are connected to lower halves of the pair of pillars 2.

The center bulk 3 includes a bulk upper portion 31 and a bulk lower portion 32. The bulk upper portion 31 is included in an upper part of the center bulk 3. The bulk lower portion 32 is connected to a lower end 31a of the bulk upper portion 31 so as to be included in a lower part of the center bulk 3 (see FIGS. 11, 12 and 13).

Left and right side parts of the bulk upper portion 31 in the vehicle width direction and an upper part of the bulk upper portion 31 are connected to the pillars 2. The bulk upper portion 31 provided behind the seat (not illustrated) has three openings 31A, 31B, and 31C and has a substantially trapezoidal shape in plan view. The openings 31A, 31B, and 31C are provided at positions where a rear window (not illustrated) and the like are provided in the vehicle 1. In the example illustrated in, for example, FIG. 12, the openings 31A and 31C are symmetric laterally.

The lower end 31a of the bulk upper portion 31 is connected to an upper end 32b of the bulk lower portion 32, thereby the bulk lower portion 32 is provided behind a seat (not illustrated) similarly to the above description. The bulk lower portion 32 has a plurality of recesses including a recess 3A, which will be described later.

Figure 12:
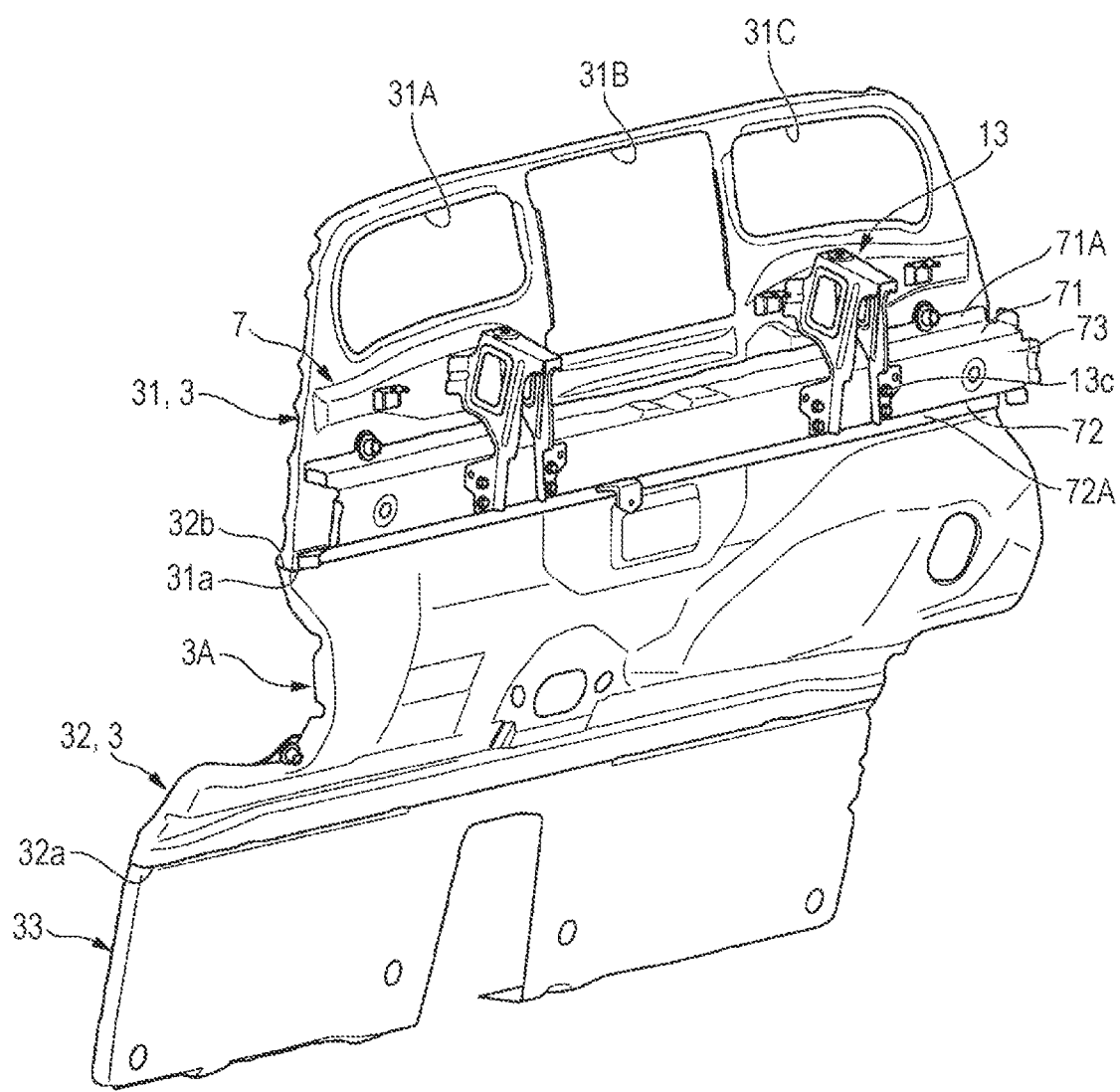
FIG. 12 is an explanatory view of the example of the vehicle body side structure according to the embodiment of the present disclosure illustrating a perspective view of the entirety of the center bulk showing the rear side.

Furthermore, in the example illustrated in, for example, FIG. 12, a bulk under portion 33, which is disposed on the floor 11 side, is attached to a lower end 32a of the bulk lower portion 32.

The gussets 4 each include a first connecting portion 41, a second connecting portion 42, a retractor attachment portion (component attachment portion) 43, and a fragile portion 4B. The first connecting portion 41 is connected to the pillar 2. The second connecting portion 42 is connected to the center bulk 3. The retractor attachment portion 43 is provided below the first connecting portion 41 and the second connecting portion 42. A retractor (vehicle body component) 5 is attached to the retractor attachment portion 43. The fragile portion 4B is provided between the second connecting portion 42 and the retractor attachment portion 43. Each of the gussets 4 also has a bead 40, which will be described in detail later. The fragile portion 4B is disposed between the bead 40 and the retractor attachment portion 43.

Figure 9:
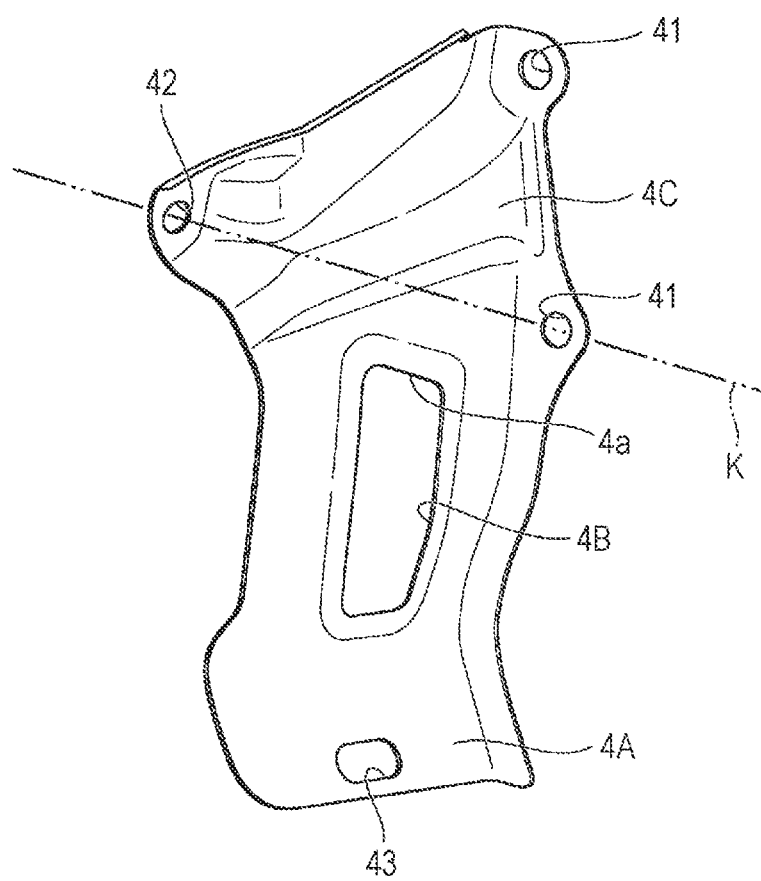
FIG. 9 is an explanatory view of the example of the vehicle body side structure according to the embodiment of the present disclosure illustrating an enlarged view of the gusset illustrated in FIG. 2.

Each of the gussets 4 according to the present embodiment is an uneven plate-shaped member having a substantially rectangular shape in plan view as illustrated in a single-unit enlarged view of FIG. 9. Furthermore, in each of the gussets 4, the first connecting portion 41, the second connecting portion 42, and the bead 40 are disposed in an upper part, the fragile portion 4B is disposed in a substantially central part, and the retractor attachment portion 43 is disposed in a lower part. In the example illustrated in FIG. 9, two of the first connecting portion 41 are formed. Furthermore, out of the above-described portions, the first connecting portions 41, the second connecting portion 42, and the retractor attachment portion 43 are formed as through holes which allow connecting bolts to be inserted therethrough. In FIG. 2, one of the first connecting portions 41 is connected to the pillar 2 by a bolt 44, and the retractor 5 is attached to the retractor attachment portion 43 by a bolt 45.

Here, as illustrated in FIG. 2, the bulk lower portion 32 that is part of the center bulk 3 has the recess 3A in which the retractor 5 is disposed. Each of the gussets 4 is disposed above the recess 3A in the example illustrated in FIG. 2. The gusset 4 also has an extension 4A that extends toward the recess 3A side of the center bulk 3 and is lapped over a front surface side, that is, a detector side, of a pretensioner sensor 52.

Figure 3:
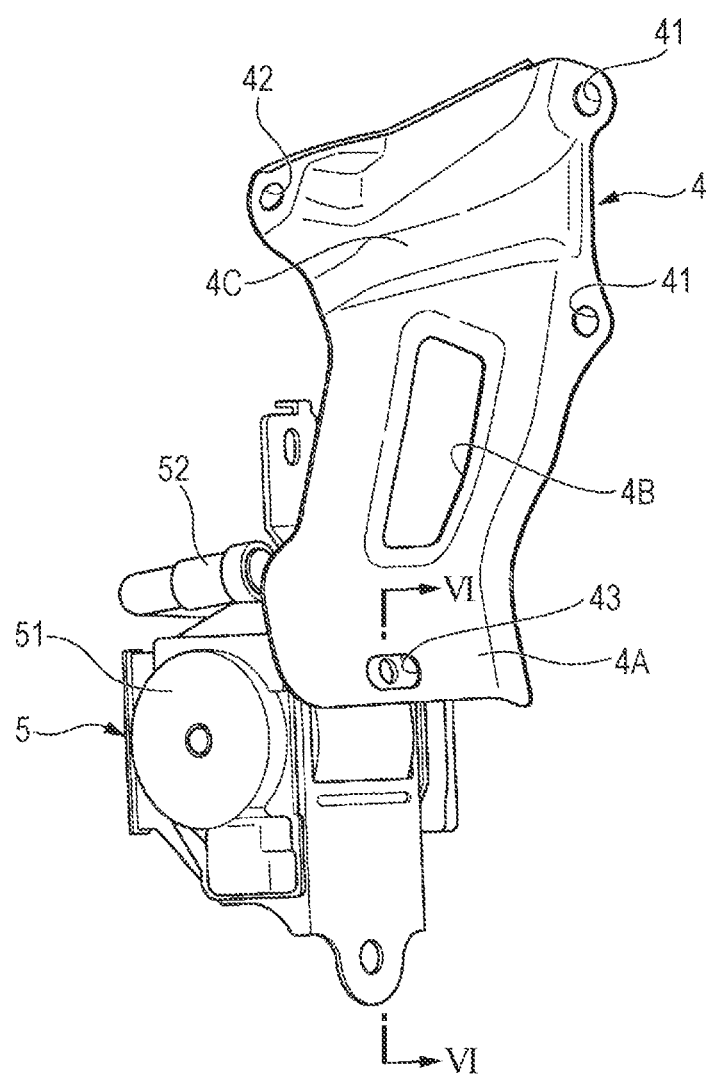
FIG. 3 is an explanatory view of the example of the vehicle body side structure according to the embodiment of the present disclosure illustrating an enlarged perspective view of a state in which the retractor illustrated in FIG. 2 is attached to a gusset.

FIG. 3 is an enlarged perspective view of a state illustrated in FIG. 2 in which the retractor 5 is attached to the gusset 4. As illustrated in FIG. 3, the retractor attachment portion 43 of the gusset 4, to which the retractor 5 is attached, is formed at a position in the extension 4A.

FIG. 4 is a perspective view in which the retractor 5 and the gusset 4 illustrated in FIG. 3 are separated from each other. As illustrated in FIG. 4, the retractor attachment portion 43 formed in the gusset 4 has a slit shape, that is, a long-hole shape that extends in the vehicle width direction. FIG. 4 also illustrates a retractor attachment bracket 6 for attaching the retractor 5 to the retractor attachment portion 43 formed in the gusset 4.

The gusset 4 includes the bead 4C that extends between the first connecting portion 41 and the second connecting portion 42 in the vehicle width direction. The bead 4C is formed above the fragile portion 4B. The bead 4C projects toward the front side of the vehicle 1 so as to have a projecting shape and extends in the vehicle width direction.

As illustrated in, for example, FIG. 2, the fragile portion 4B provided in the gusset 4 according to the present embodiment is defined by a substantially rectangular through hole and disposed such that an upper edge portion 4a thereof extends along a virtual straight line K that connects one of the first connecting portions 41 and the second connecting portion 42 to each other. In the example illustrated in, for example, FIG. 9, the upper edge portion 4a of the fragile portion 4B extends along and is spaced apart from the virtual straight line K that connects the second connecting portion 42 and the lower first connecting portion 41 out of two first connecting portions 41.

Figure 7:
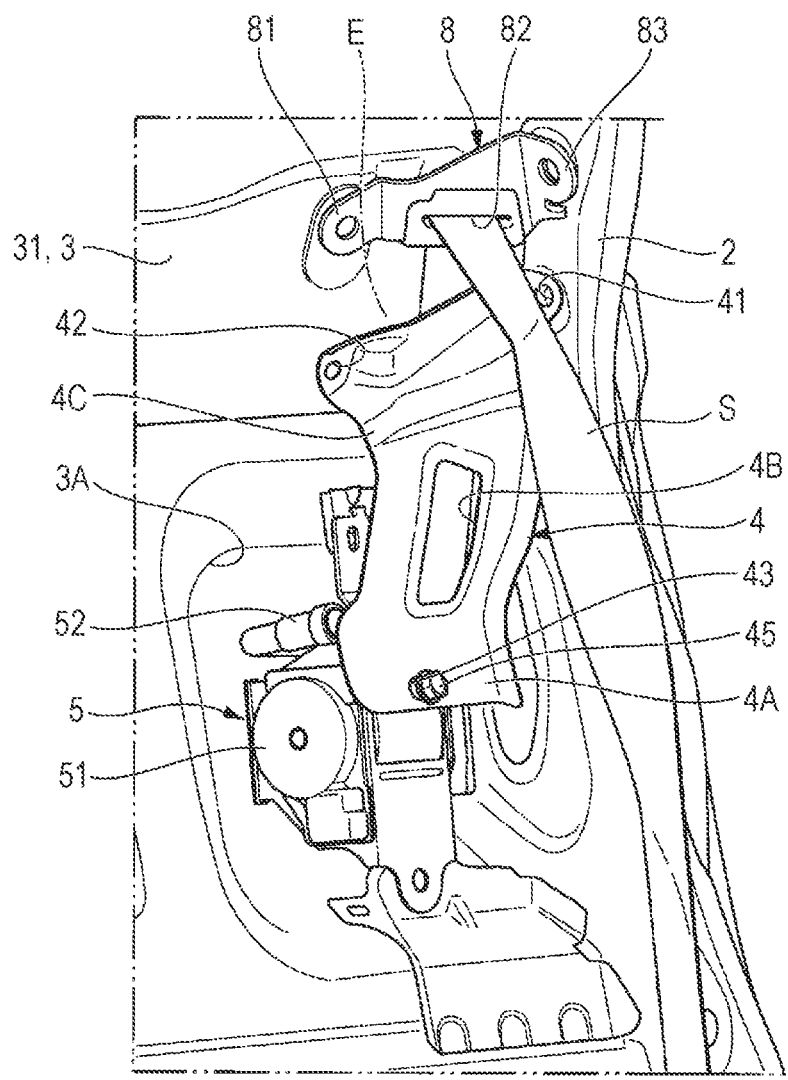
FIG. 7 is an explanatory view of the example of the vehicle body side structure according to the embodiment of the present disclosure illustrating a perspective view of a state in which a seat belt is attached to the vehicle body side structure illustrated in FIG. 2.

FIG. 7 is a perspective view illustrating a state in which a seat belt S is attached to the vehicle body side structure 10 illustrated in, for example, FIG. 2. As illustrated in FIG. 7, the gusset 4 is spaced apart from the center bulk 3 toward the front side by a specified distance, thereby forming a gap therebetween. By this gap, an insertion opening E is formed. The seat belt S withdrawn from the retractor 5 can be inserted through the insertion opening E in the vehicle body side structure 10.

The retractor 5 includes a retractor main body 51 and the pretensioner sensor 52. The retractor 5 retracts the seat belt S illustrated in FIG. 7. Although detailed illustration is omitted, the seat belt S is wound in the retractor main body 51, upwardly withdrawn from the retractor 5 through the insertion opening E by an operation performed by an occupant, and pays out through an insertion slit 82 provided in a D-ring bracket 8, which will be described later. A tip end portion (not illustrated) of this seat belt S is connected to a seat belt anchor (not illustrated) provided in the vehicle 1. Also, a tongue plate (not illustrated) is attached to the seat belt S. The tongue plate can be detachably attached to a buckle (not illustrated) provided in the vehicle 1.

That is, the seat belt S is retracted by the retractor 5 in its initial state. When the seat belt S is withdrawn and the tongue plate is secured to the buckle by the occupant, the seat belt S mainly restrains the chest and the abdomen of the occupant. A retracting spring (not illustrated) and a lock mechanism (not illustrated) are disposed in the retractor main body 51. The retracting spring urges the seat belt S in a retracting direction, and the lock mechanism (not illustrated) locks the seat belt S so that the seat belt S is not withdrawn in such a case where the seat belt S is suddenly withdrawn or a shock is input to the vehicle.

The pretensioner sensor 52 provided in the retractor 5 detects a shock or the like when a collision of the vehicle 1 occurs. The pretensioner sensor 52 allows the seat belt S to be retracted before the payout of the seat belt S from the retractor 5 is prohibited. Thus, the occupant can be restrained early by the seat belt S.

Figure 5A:
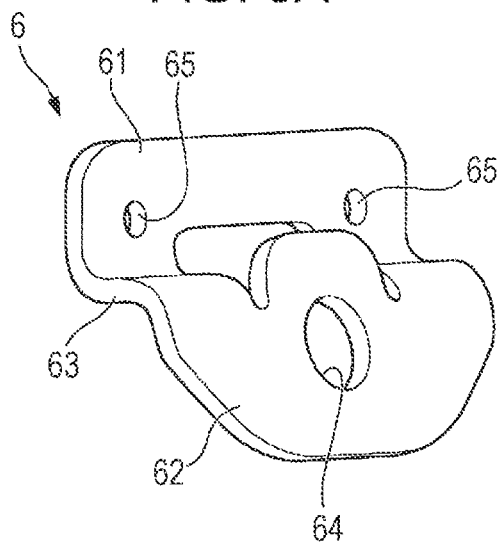
FIGS. 5A and 5B are explanatory views of the example of the vehicle body side structure according to the embodiment of the present disclosure illustrating perspective views of a retractor attachment bracket illustrated in FIG. 4 seen at respective different angles.
Figure 5B:
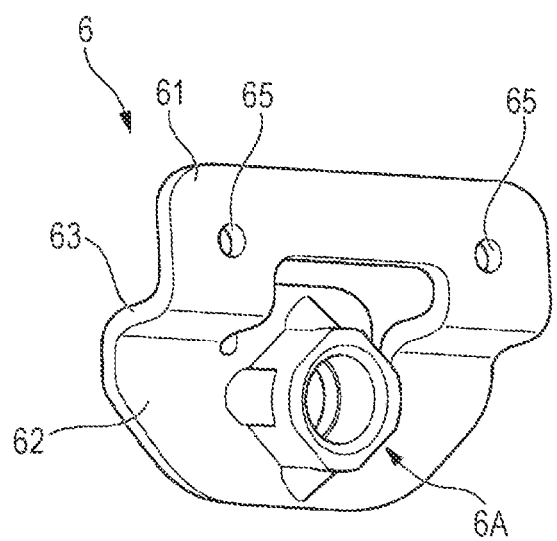

FIGS. 5A and 5B are perspective views of the retractor attachment bracket illustrated in FIG. 4 seen at respective different angles. As illustrated in FIGS. 5A and 5B, the retractor attachment bracket 6 is a metal member having a bent substantially S shape in section. The retractor attachment bracket 6 includes a first piece portion 61, a bent portion 63, and a second piece portion 62. The first piece portion 61 is attached to the retractor 5. The bent portion 63 is bent and extends from the first piece portion 61 toward the gusset 4 side. The second piece portion 62 extends from the tip of the bent portion 63 so as to be parallel to the first piece portion 61.

The first piece portion 61 of the retractor attachment bracket 6 has two through holes 65. Bolts 66 (see FIG. 6) for attaching the retractor attachment bracket 6 to the retractor 5 are inserted through the through holes 65.

Furthermore, the second piece portion 62 has a through hole 64 that allows a fastening member, that is, the bolt 45 illustrated in, for example, FIG. 2, to be inserted therethrough. The second piece portion 62 includes a portion to be fastened 6A that is coaxial with the through hole 64 and welded onto a surface of the second piece portion 62 facing the retractor 5 side. The portion to be fastened 6A is a nut-shaped member that has a cylindrical shape and has a threaded portion (not illustrated) therein. The portion to be fastened 6A can be coupled to one surface side of the second piece portion 62 by a known related-art welding method.

Figure 6:
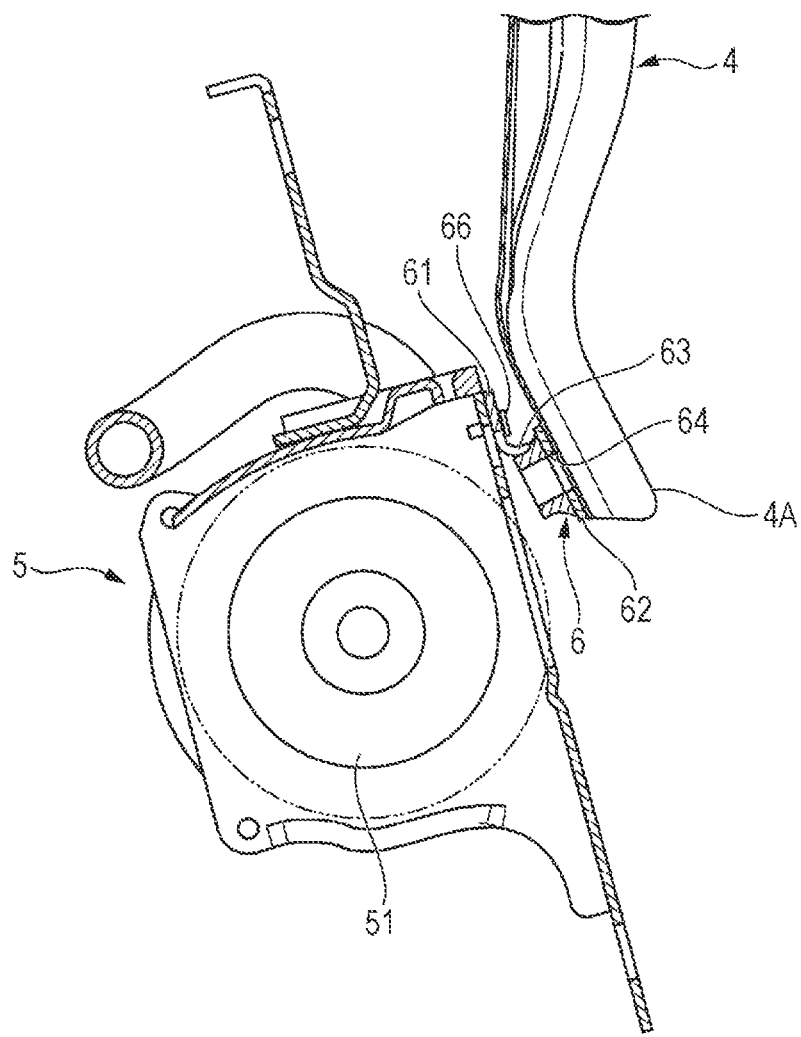
FIG. 6 is an explanatory view of the example of the vehicle body side structure according to the embodiment of the present disclosure illustrating a sectional view taken along line VI-VI illustrated in FIG. 3.

FIG. 6 is a sectional view taken along line VI-VI in FIG. 3 illustrating a state in which the retractor 5 is attached to the retractor attachment portion 43 of the gusset 4 by using the retractor attachment bracket 6. As illustrated in FIG. 6, the retractor 5 is secured to the retractor attachment portion 43 formed at the extension 4A of the gusset 4 by, for example, screwing the bolt 45 (see FIG. 2) into the portion to be fastened 6A of the retractor attachment bracket 6.

With the vehicle body side structure 10 according to the embodiment having the above-described structure, first, the gussets 4, which are connected to the pillars 2, and the center bulk 3 are provided. Thus, when a side collision load is input, the load can be effectively transmitted from the corresponding pillar 2 to the center bulk 3 through a corresponding one of the gussets 4. Accordingly, the side collision load can be effectively dispersed. This can improve the collision performance of the entirety of the vehicle 1.

Furthermore, even in the case where vehicle body component such as a retractor 5 is attached to the gusset 4 that transmits the side collision load as described above, a load input from the pillar 2 side to the gusset 4 through the first connecting portion 41 can be absorbed by the fragile portion 4B by forming the fragile portion 4B as the through hole structured as described above between the first and second connecting portions 41 and 42 and the retractor attachment portion 43. This reduces the load transmitted to the retractor 5 attached below the fragile portion 4B. Thus, various types of malfunctioning of the retractor 5 can be prevented.

In the case where, as described above, the upper edge portion 4a of the through hole that defines the fragile portion 4B, is disposed along the virtual straight line K connecting the first connecting portion 41 and the second connecting portion 42 of the gusset 4, and the upper edge portion 4a is slightly spaced apart from the virtual straight line K, no hole (through hole) exists in the virtual straight line K. This allows high load transmission efficiency to be maintained.

Furthermore, the gusset 4 includes the extension 4A that is lapped over the front surface side of the pretensioner sensor 52. Thus, the pretensioner sensor 52 can be protected by the extension 4A that serves as a lower end portion of the gusset 4. Accordingly, even when, for example, the seat (not illustrated) is reclined or slid back and forth with some foreign matter interposed between the seat and the pretensioner sensor 52, the pretensioner sensor 52 is protected. This can protect the pretensioner sensor 52 against damage and thus protect the retractor 5.

Furthermore, the retractor 5 is connected to the extension 4A of the gusset 4. Thus, even when the gusset 4 is deformed or moved by contact of the gusset 4 with foreign matter, the gusset 4 itself can be prevented from being brought into contact with the pretensioner sensor 52 provided in the retractor 5 because the gusset 4 and the retractor 5 are moved together. Thus, the pretensioner sensor 52 can be reliably protected against damage.

Furthermore, with the bead 4C having the above-described structure provided in the gusset 4, the side collision load can be transmitted through a ridge portion of the bead 40 having high strength. Accordingly, the side collision load can be effectively dispersed. This can further improve the collision performance.

Furthermore, by concentrating the side collision load toward the bead 4C, the load transmitted toward the fragile portion 4B and the retractor attachment portion 43 side can be reduced. This can reduce the load input to the components of the retractor 5, and accordingly, damage can be prevented.

Furthermore, the gap is formed between the gusset 4 and the center bulk 3, thereby forming the insertion opening E, through which the seat belt S withdrawn from the retractor 5 can be inserted. Thus, the gusset 4 can protect the seat belt S from an external environment.

Here, the retractor attachment portion 43 formed in the gusset 4 is the slit-shaped hole as has been described. Thus, even after the retractor 5 is temporarily assembled to the retractor attachment portion 43 of the gusset 4, the gusset 4 can be moved in the vehicle width direction within a range in which the slit is provided and fastened with reference to the first connecting portion 41 on the pillar 2 side, and after that, the second connecting portion 42 and the center bulk 3 can be firmly assembled together and the retractor attachment portion 43 and the retractor 5 can be firmly assembled together. Thus, the pillar 2 and the gusset 4 can be connected while reliably being in tight contact with each other at the first connecting portion 41 on the pillar 2 side, and no gap is formed between the pillar 2 and the gusset 4 after the assembly. This further improves the transmission efficiency of the side collision load.

Furthermore, according to the present embodiment, when the retractor attachment bracket 6 as described above is provided, and the retractor 5 is attached to the retractor attachment portion 43 of the gusset 4 by using the retractor attachment bracket 6, work efficiency of assembling the gusset 4 to the retractor 5 can be improved.

Furthermore, according to the present embodiment, even when the recess 3A in which the retractor 5 is disposed and housed is provided in the center bulk 3 as illustrated in, for example, FIG. 2, a load applied to the recess 3A can be dispersed by concentrating the side collision load in the gusset 4 side. Thus, damage to the retractor 5 disposed in the recess 3A and the pretensioner sensor 52 provided in the retractor 5 can be prevented.

Figure 8:
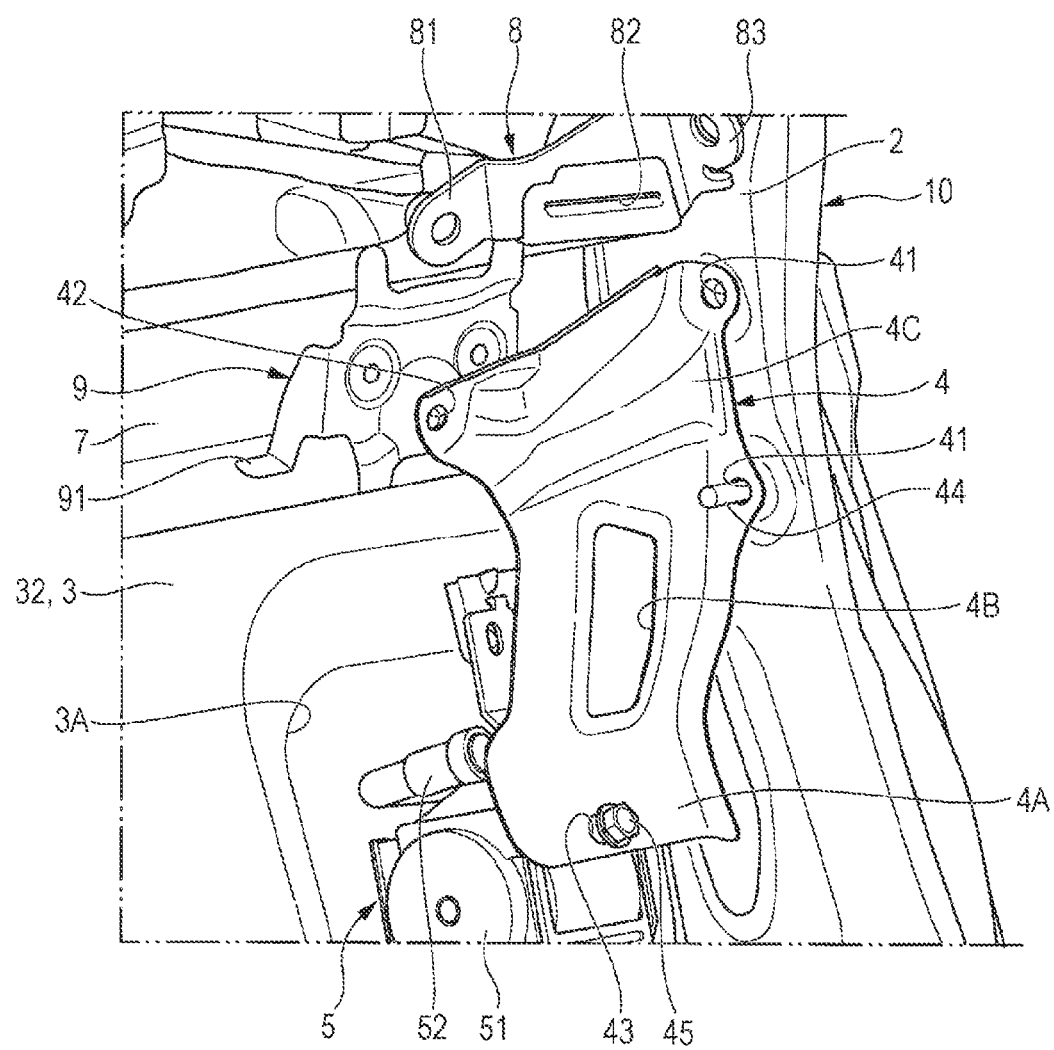
FIG. 8 is an explanatory view of the example of the vehicle body side structure according to the embodiment of the present disclosure illustrating an enlarged schematic view of a main portion illustrated in FIG. 2 with a bulk upper portion removed.

Next, FIG. 8 is an enlarged schematic view of a main portion of the vehicle body side structure 10 illustrated in, for example, FIG. 2 with the bulk upper portion 31 of the center bulk 3 removed. As illustrated in FIG. 8, the vehicle body side structure 10 further includes a cross member 7 and D-ring brackets 8. The cross member 7 is coupled to a rear surface of the center bulk 3 and defines a closed section extending in the vehicle width direction. The D-ring brackets 8 each disposed above a corresponding one of the gussets 4 extend in the vehicle width direction and coupled to a corresponding one of the pillars 2 and the center bulk 3. Here, each of the D-ring brackets 8 has a fastening portion 81 on one end side thereof for the center bulk 3. The cross member 7 is also fastened at the fastening portion 81 (see FIGS. 7 and 8). Each of the D-ring brackets 8 has another fastening portion 83 on the other side thereof at which the D-ring bracket 8 is fastened to a corresponding one of the pillars 2.

Figure 10:
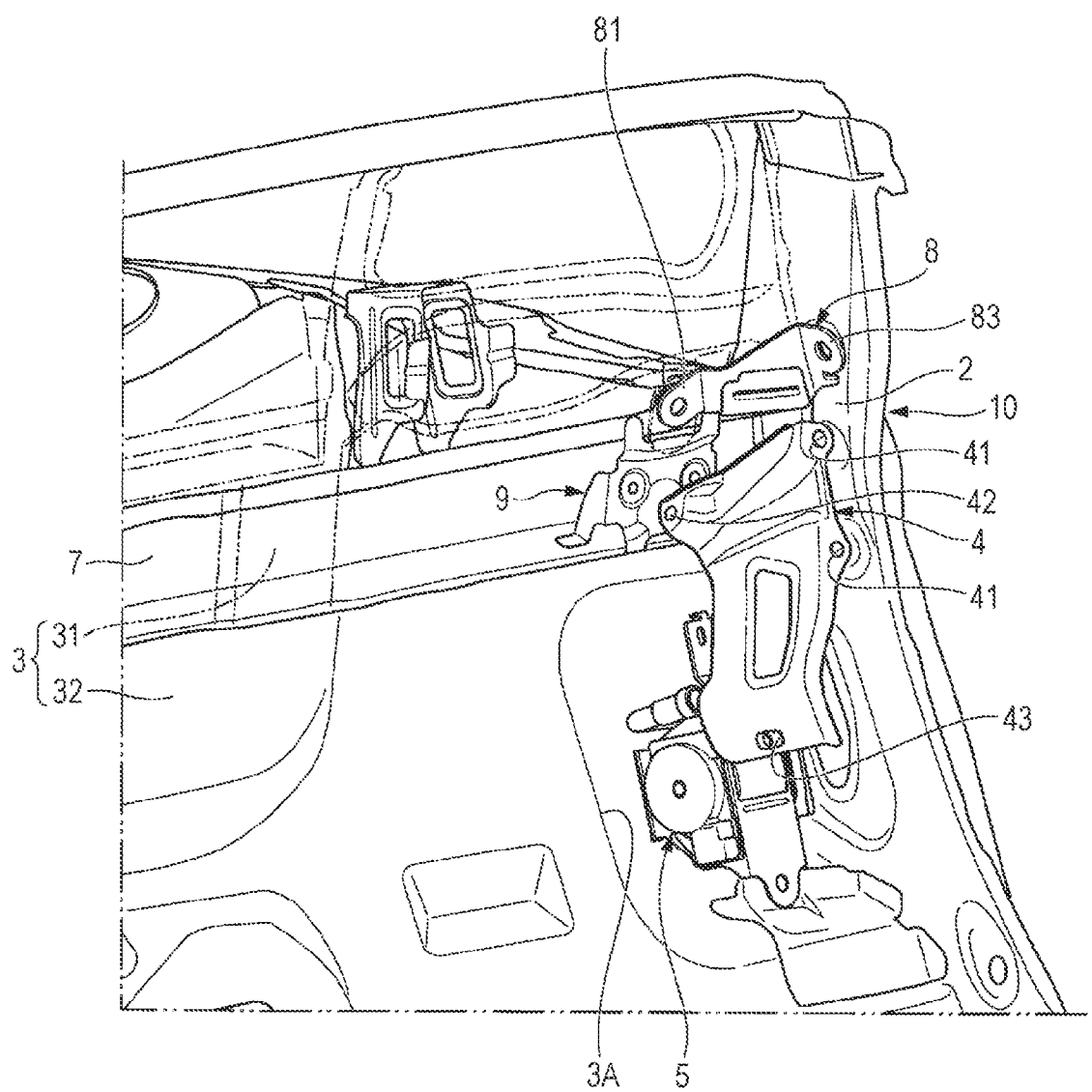
FIG. 10 is an explanatory view of the example of the vehicle body side structure according to the embodiment of the present disclosure illustrating a schematic view seen through the bulk upper portion.

FIG. 10 is a schematic view of the vehicle body side structure 10 and a part around the vehicle body side structure 10 seen through the bulk upper portion 31. As illustrated in FIGS. 8 and 10, the vehicle body side structure 10 according to the present embodiment further includes patches 9 interposed between the center bulk 3 and the cross member 7. The second connecting portion 42 of each of the gussets 4 together with a corresponding one of the patches 9 are connected to the center bulk 3.

Figure 11:
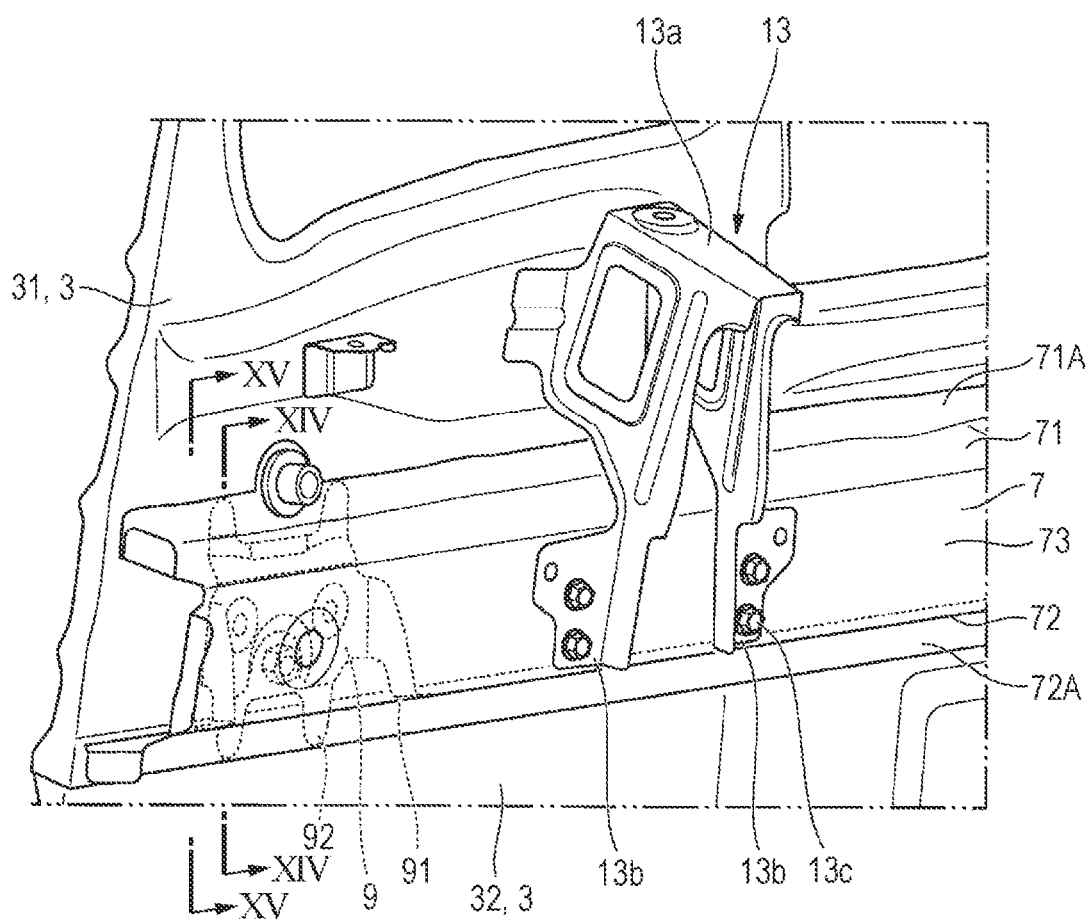
FIG. 11 is an explanatory view of the example of the vehicle body side structure according to the embodiment of the present disclosure illustrating a perspective view of part of a center bulk showing the rear side.
Figure 13:
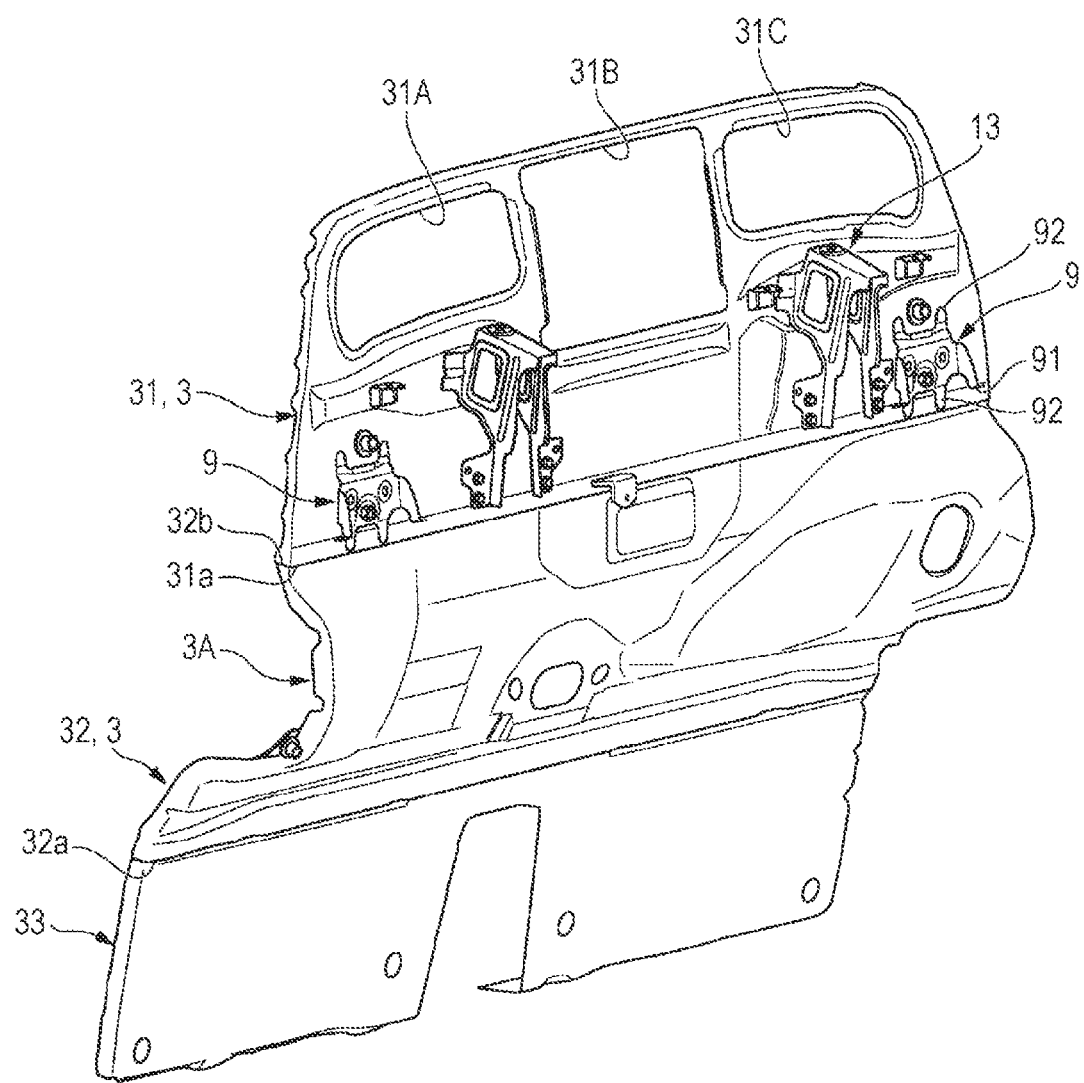
FIG. 13 is an explanatory view of the example of the vehicle body side structure according to the embodiment of the present disclosure illustrating a perspective view of the entirety of the center bulk showing the rear side with a cross member removed.

FIG. 11 is a perspective view of part of the center bulk 3 seen from the rear side. FIG. 12 is a perspective view of the entirety of the center bulk 3 seen from the rear side. FIG. 13 is a perspective view of the entirety of the center bulk 3 seen from the rear side with the cross member 7 removed.

Figure 14:
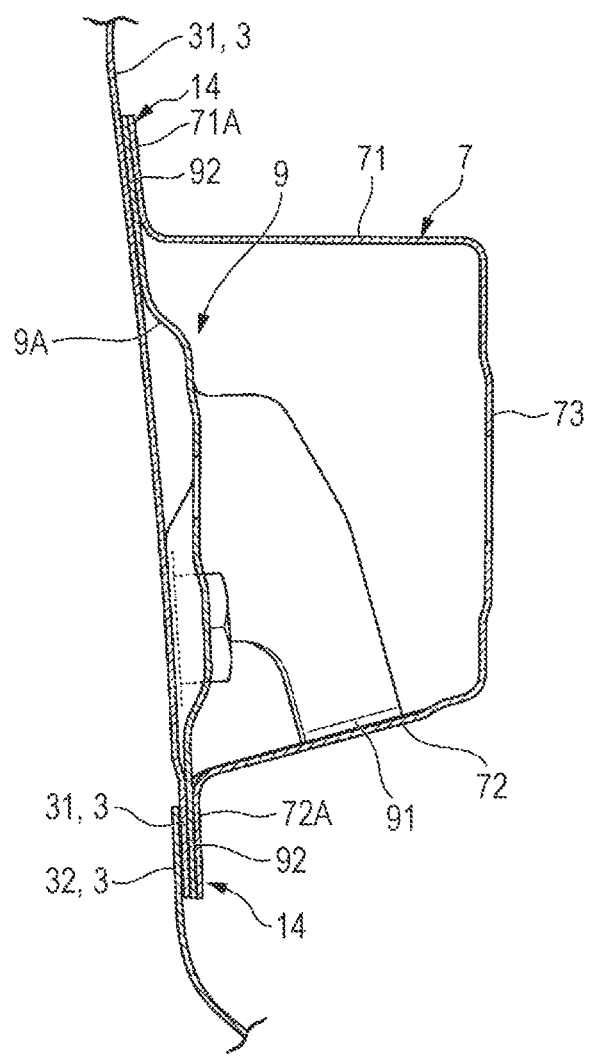
FIG. 14 is an explanatory view of the example of the vehicle body side structure according to the embodiment of the present disclosure illustrating a sectional view taken along line XIV-XIV illustrated in FIG. 11.
Figure 15:
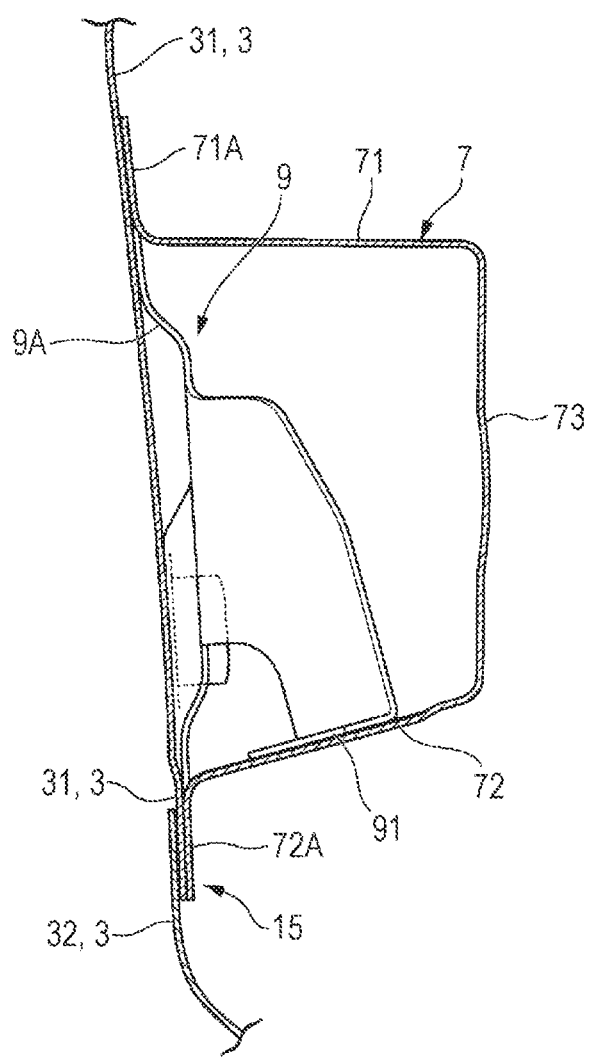
FIG. 15 is an explanatory view of the example of the vehicle body side structure according to the embodiment of the present disclosure illustrating a sectional view taken along line XV-XV illustrated in FIG. 11.

Furthermore, FIG. 14 is a sectional view of the center bulk 3 and the structure around the center bulk 3 illustrated in FIG. 11 taken along line XIV-XIV in FIG. 11. FIG. 15 is a sectional view of the center bulk 3 and the structure around the center bulk 3 illustrated in FIG. 11 taken along line XV-XV in FIG. 11.

As illustrated in the perspective view of FIG. 11 and the sectional views of FIGS. 14 and 15, the cross member 7 has a U-shaped portion in section formed by a pair of an upper wall 71 and a lower wall 72 that face each other and a rear wall 73 that connects rear ends of the upper wall 71 and the lower wall 72 to each other.

Also, the cross member 7 has a hat-shaped section formed by an upper flange portion 71A that extends upward from a front end of the upper wall 71 and a lower flange portion 72A that extends downward from a front end of the lower wall 72.

As illustrated in FIG. 8, each of the patches 9 includes leg portions 91 connected to the lower wall 72 of the cross member 7. Furthermore, as illustrated in FIGS. 14 and 15, each of the patches 9 is housed in the U-shaped space allocated in the cross member 7 and includes a patch base portion 9A having a smooth recess region 9a.

Each of the patches 9 also includes patch flange portions 92 interposed between the center bulk 3 and either the upper flange portion 71A or the lower flange portion 72A of the cross member 7.

As illustrated in the sectional view of FIG. 14, the center bulk 3 is coupled to the upper flange portion 71A, the lower flange portion 72A, and the patch flange portions 92 at first spot welded portions 15 at each of which at least three of the center bulk 3, the upper flange portion 71A, the lower flange portion 72A, and the patch flange portions 92 are spot welded to one another.

Furthermore, the vehicle body side structure 10 includes second spot welded portions 16 disposed to the left and right of the patch flange portions 92 of each of the patches 9 in the vehicle width direction. At each of the second spot welded portions 16, at least three pieces including the bulk upper portion 31, the bulk lower portion 32, and the lower flange portion 72A of the cross member 7 are welded to one another.

Furthermore, the above-described cross member 7 is secured to the bulk upper portion 31 by vertical frames 13. Each of the vertical frames 13 includes two arm portions 13b branched from a frame base portion 13a so as to form an inverted V shape. In the example illustrated in, for example, FIG. 11, the frame base portion 13a of each of the vertical frames 13 is welded to the bulk upper portion 31 and the arm portions 13b are secured to the cross member 7 by bolts 13c. Thus, the cross member 7 and the bulk upper portion 31 are secured to each other.

According to the embodiment, with each of the D-ring brackets 8 connected to a corresponding one of the pillars 2 and the center bulk 3 (bulk upper portion 31) as described above, the side collision load can be directly transmitted from any one of the pillars 2 to the center bulk 3 through the D-ring bracket 8. In addition to this, since the side collision load can be transmitted to the upper flange portion 71A and the lower flange portion 72A of the cross member 7, load transmission efficiency is further improved.

Furthermore, since the second connecting portion 42 of each of the gussets 4 together with each of the patches 9 is connected to the center bulk 3 as described above, the side collision load transmitted from the gusset 4 can be dispersed by efficiently transmitting the side collision load to the cross member 7 and the patch 9.

Furthermore, the leg portions 91 of each of the patches 9 are connected to the lower wall 72 of the cross member 7.

Thus, when, for example, reception of the side collision load leads to application of a load that, for example, distorts a front end of the pillar 2 rearward and inward in the vehicle width direction, such a load can be dispersed by transmitting the load to the lower wall 72 of the cross member 7. Accordingly, the side collision load can be dispersed by efficiently transmitting the side collision loads to the cross member 7 and the center bulk 3.

Furthermore, since superposed three pieces of the center bulk 3, the upper flange portion 71A and the lower flange portion 72A, and the patch flange portions 92 are spot welded at each of the first spot welded portions 15 as described above, the stiffness of the closed section of the cross member 7 is improved. Furthermore, by adopting the welding of superposed three pieces as described above, weldability of spot welding can be improved and work efficiency during the spot welding can be improved.

Furthermore, since the center bulk 3 is divided into the bulk upper portion 31 and the bulk lower portion 32 as described above, the formability of the center bulk 3 can be improved. Also with such a structure, the welding of superposed three pieces at each of the second spot welded portions 16 can be adopted. Thus, weldability of spot welding can be improved and work efficiency during the spot welding can be improved.

In a method used for the spot welding of superposed three pieces for forming the first spot welded portions 15 and the second spot welded portions 16, related-art known conditions, procedures, and welding machines can be adopted without limitation.

Although the embodiment of the present disclosure has been described with reference to the accompanying drawings, it is obvious that the present disclosure is not limited to the aforementioned embodiment. The shapes of the elements and combination of the elements described in the aforementioned embodiment are examples, and various changes based on, for example, a design request are possible without departing from the gist of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims.

We claim:

1. A vehicle body side structure comprising:
   a pair of left and right pillars, each extending in an up-down direction at respective side parts of a vehicle body;
   a center bulk that is disposed behind a seat of a vehicle and that extends between the pair of pillars in a vehicle width direction; and
   a gusset connected to one of the pillars and the center bulk,
   wherein the gusset includes
   a first connecting portion connected to the one of the pillars,
   a second connecting portion connected to the center bulk,
   a component attachment portion that is provided below the first connecting portion and the second connecting portion and that is to be attached with a vehicle body component, and
   a fragile portion provided between the second connecting portion and the component attachment portion.

2. The vehicle body side structure according to claim 1, wherein the gusset includes a bead that is provided between the first connecting portion and the second connecting portion above the fragile portion and that extends in the vehicle width direction.

3. The vehicle body side structure according to claim 1, wherein the fragile portion is defined by a through hole formed in the gusset, and
wherein an upper edge portion of the through hole is disposed along a virtual straight line that connects the first connecting portion and the second connecting portion to each other.

4. The vehicle body side structure according to claim 1, further comprising:
a cross member that is coupled to a rear surface of the center bulk and that defines a closed section extending in the vehicle width direction; and
a patch interposed between the center bulk and the cross member,
wherein the second connecting portion of the gusset is connected to the center bulk together with the patch.

5. The vehicle body side structure according to claim 4, wherein the cross member has a U-shaped portion in section formed by a pair of an upper wall and a lower wall which face each other and a rear wall that connects a rear end of the upper wall and a rear end of the lower wall to each other, and
wherein the patche includes a leg portion connected to the lower wall of the cross member.

6. The vehicle body side structure according to claim 5, wherein the cross member has a hat-shaped section formed by an upper flange portion that extends upward from a front end of the upper wall and a lower flange portion that extends downward from a front end of the lower wall,
wherein the patch includes patch flange portions, one of the patch flange portions interposed between the center bulk and the upper flange portion of the cross member, and the other of the patch flange portions interposed between the center bulk and the lower flange portion of the cross member, and
wherein the vehicle body side structure further comprises a first spot welded portion at which at least three of the center bulk, the upper flange portion or the lower flange portion, and the respective patch flange portions are welded to one another by spot welding is provided.

7. The vehicle body side structure according to claim 6, wherein the center bulk includes
a bulk upper portion that is included in an upper part of the center bulk, and
a bulk lower portion that is coupled to a lower end of the bulk upper portion and that is included in a lower part of the center bulk, and
wherein the vehicle body side structure further comprises second spot welded portions at each of which at least three pieces including the bulk upper portion, the bulk lower portion, and the lower flange portion of the cross member are spot welded to one another, the second spot welded portions being provided at positions on the left and on the right of the patch flange portions of the patch in the vehicle width direction.

8. The vehicle body side structure according to claim 1, wherein the gusset is spaced apart from the center bulk toward a front side by a specified distance so as to have a gap between the gusset and the center bulk, and
wherein an insertion opening for a seat belt is formed by the gap.

9. The vehicle body side structure according to claim 1, wherein the vehicle body component is a retractor for a seat belt, and the retractor includes a pretensioner sensor,
wherein the gusset includes an extension portion that extends lower than the pretensioner sensor, and
wherein the component attachment portion to be connected to the retractor is provided in the extension portion.

10. The vehicle body side structure according to claim 1, wherein the component attachment portion has a slit shape that extends in the vehicle width direction.

11. The vehicle body side structure according to claim 1, wherein the fragile portion is provided between the first connecting portion and the component attachment portion.

12. The vehicle body side structure according to claim 1, wherein the first connecting portion and the second connecting portion are located along the vehicle width direction.

13. The vehicle body side structure according to claim 1, wherein the gusset includes a left gusset connected to the left pillar and the center bulk, and a right gusset connected to the right pillar and the center bulk.

14. A vehicle comprising the vehicle body side structure according to claim 1.

15. The vehicle body side structure according to claim 1, wherein the first connecting portion and the second connecting portion are disposed in an upper part of the gusset, the fragile portion is disposed in a substantially middle part of the gusset, and the component attachment portion is disposed in a lower part of the gusset.

16. A vehicle body side structure comprising:
a pair of left and right pillars, each extending in an up-down direction at respective side parts of a vehicle body;
a center bulk that extends between the pair of pillars in a vehicle width direction; and
a gusset connected to one of the pillars and the center bulk,
wherein the gusset includes
a first connecting portion connected to the one of the pillars,
a second connecting portion connected to the center bulk,
a component attachment portion that is to be attached with a vehicle body component, the component attachment portion is disposed away from an axis connecting between the first connecting portion and the second connecting portion, the component attachment portion is disposed at a position located in a direction intersecting the axis, and
a fragile portion provided between the axis and the component attachment portion.

17. The vehicle body side structure according to claim 16, wherein the fragile portion absorbs collision load applied to the first connecting portion and transmitted to the component attachment portion.

* * * * *